(12) United States Patent
Chi-Min

(10) Patent No.: US 6,253,893 B1
(45) Date of Patent: Jul. 3, 2001

(54) FLAT CABLE TYPE EXTENSION WIRE

(76) Inventor: Hu Chi-Min, No. 316, Mintsu West Road, Taipei (TW)

( * ) Notice: Subject to any disclaimer, the term of this patent is extended or adjusted under 35 U.S.C. 154(b) by 0 days.

(21) Appl. No.: 09/239,962

(22) Filed: Jan. 29, 1999

(51) Int. Cl.$^7$ .................................................. H02G 11/02
(52) U.S. Cl. .................................... 191/12.4; 191/12.2 R; 174/117 F; 174/113 R
(58) Field of Search .............................. 191/12.2 R, 12.4; 439/35; 174/69, 117 F, 113 R

(56) References Cited

U.S. PATENT DOCUMENTS

| | | | | |
|---|---|---|---|---|
| 2,064,513 | * | 12/1936 | Andrews | 191/12.2 R |
| 3,346,705 | * | 10/1967 | Slinkard et al. | 191/12.4 |
| 3,705,962 | * | 12/1972 | Banister | 191/12.4 |
| 3,773,987 | * | 11/1973 | Davis et al. | 191/12.4 |
| 4,227,041 | * | 10/1980 | Den et al. | 174/117 F |
| 4,685,634 | * | 8/1987 | Schwartz | 242/96 |
| 4,807,098 | * | 2/1989 | Ahroni | 362/249 |
| 5,499,928 | * | 3/1996 | Satoh | 439/492 |

* cited by examiner

*Primary Examiner*—S. Joseph Morano
*Assistant Examiner*—Frantz F. Jules

(57) ABSTRACT

A flat cable type extension wire including a flat cable connected between an electric plug and a socket is disclosed. The flat cable is composed of a first wire group and a second wire group each of which is composed of a plurality of parallelly arranged conductive wires. One end of each conductive wire of the first wire group is connected with a first plug terminal of the plug, while the other end of the conductive wire is connected to a first conductive contact of the socket. One end of each conductive wire of the second wire group is connected with a second plug terminal of the plug, while the other end of the conductive wire is connected to a second conductive contact of the socket. The first wire group and the second wire group are isolated from each other by an insulative section with a certain width. The extension wire is further connected with a winding mechanism for winding the flat cable into a housing.

2 Claims, 5 Drawing Sheets

FLAT CABLE TYPE EXTENSION WIRE

BACKGROUND OF THE INVENTION

1. Field of the Invention

The present invention relates to an improvement of an electric extension wire, and more particularly to a flat cable type extension wire including a flat cable connected between an electric plug and a socket.

2. Description of the Prior Art

An extension wire can be conveniently used without limitation of application environment. In addition, the extension wire can be easily stored without occupying much room. So, various extension wires are commercially available for use in family, factory, store, outdoor working site, etc. Especially, a winding type extension wire can be wound up for easy storage and thus is more widely used.

A conventional extension wire includes a socket and a plug connected to the ends of a pair of electric wires. In use, the plug is plugged into an electric socket and the socket is pulled to an application position for a distal electric appliance to plug in. Such structure is quite simple and widely used in a family or a commercial store.

However, such extension wire may have two or three electric wires, depending on the power system of the application environment. Also, according to the required electric current, the extension wires with different wire diameters are selectively used. In the case of a high current load, the extension wire will have relatively large diameter electric wires. In use of such large diameter extension wire, the extension wire cannot be laid flat on the ground and thus cause a person to stumble. Moreover, it is difficult to collect the extension wire.

A conventional winding type extension wire typically includes a cable, a winding reel for winding the cable and a housing for enclosing the wound cable.

The winding reel is connected with a winding spring for providing a winding force for the cable. One end of the cable is connected with a plug, while the other end thereof is connected with a socket disposed on the housing.

However, often the extension wire in the conventional winding type is tangled during winding. For example, when winding the extension wire, in order to smoothly and evenly wind the cable into the housing, a user must very carefully adjust the winding position of the cable (for example, from left side to right side or from right side to left side).

Otherwise, the uneven left and right sides of the wound cable will lead to unsmooth winding and uneven winding force, thus resulting overlapping and tangling of the cable or even make the cable touch the inner wall of the housing and disable the winding reel from winding the cable.

SUMMARY OF THE INVENTION

It is therefore a primary object of the present invention to provide a flat cable type extension wire including a flat bus-line structure which is applicable to various specific sites. Especially, the flat bus-line structure is suitable to lie flat on the a ground, a wall edge or pass through a narrow gap. The flat cable is composed of a plurality of parallelly arranged conductive wires.

It is a further object of the present invention to provide the above flat cable type extension wire which is connected with a winding mechanism. When used, the extension wire is pulled outward and unwound from the winding mechanism. When not used, the extension wire is collectively wound on a winding reel in a housing. By means of the flat bus-line structure, the extension wire can be evenly wound without tangling or blocking.

The present invention can be best understood through the following description and accompanying drawings, wherein:

DETAILED DESCRIPTION OF THE PREFERRED EMBODIMENTS

Figure 1:
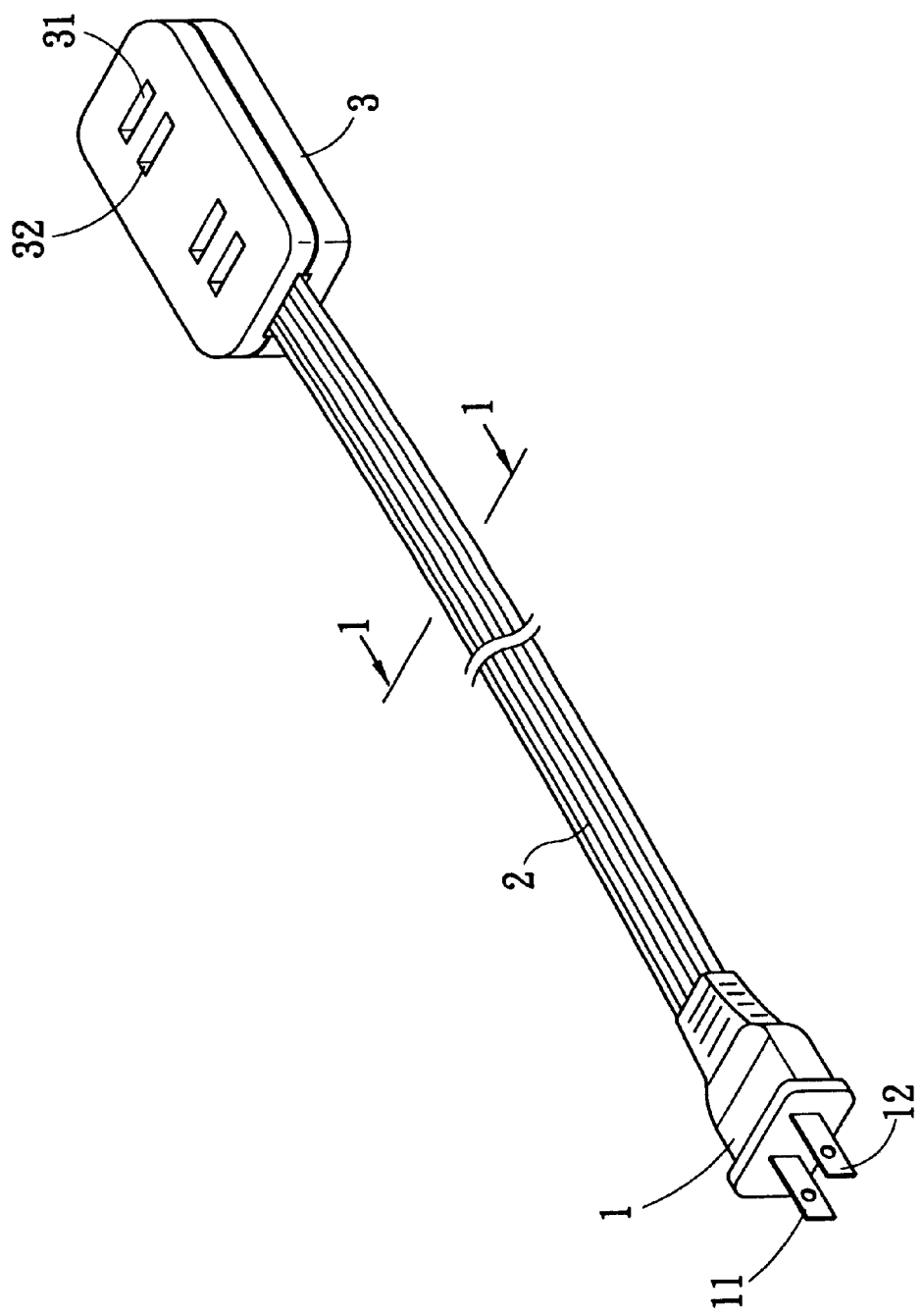
FIG. 1 is a perspective view of a first embodiment of the flat cable type extension wire in accordance with the present invention.

Please refer to FIG. 1 which is a perspective view of the flat cable type extension wire of the present invention. The extension wire includes an electric plug 1, an electric socket 3, and a flat cable 2 connected between the plug 1 and the socket 3.

Figure 2:
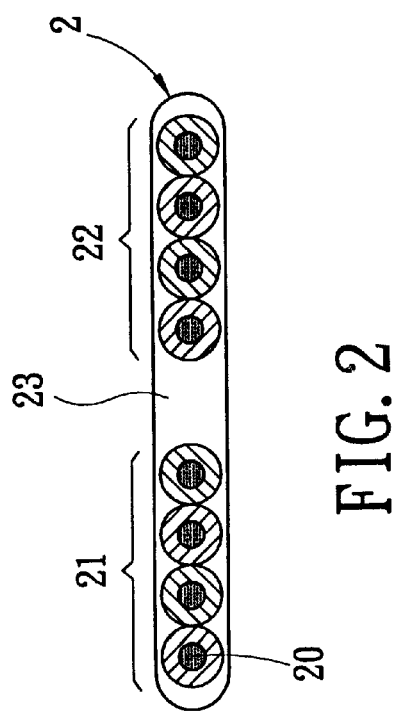
FIG. 2 is a sectional view taken along line 1—1 of FIG. 1.
Figure 3:
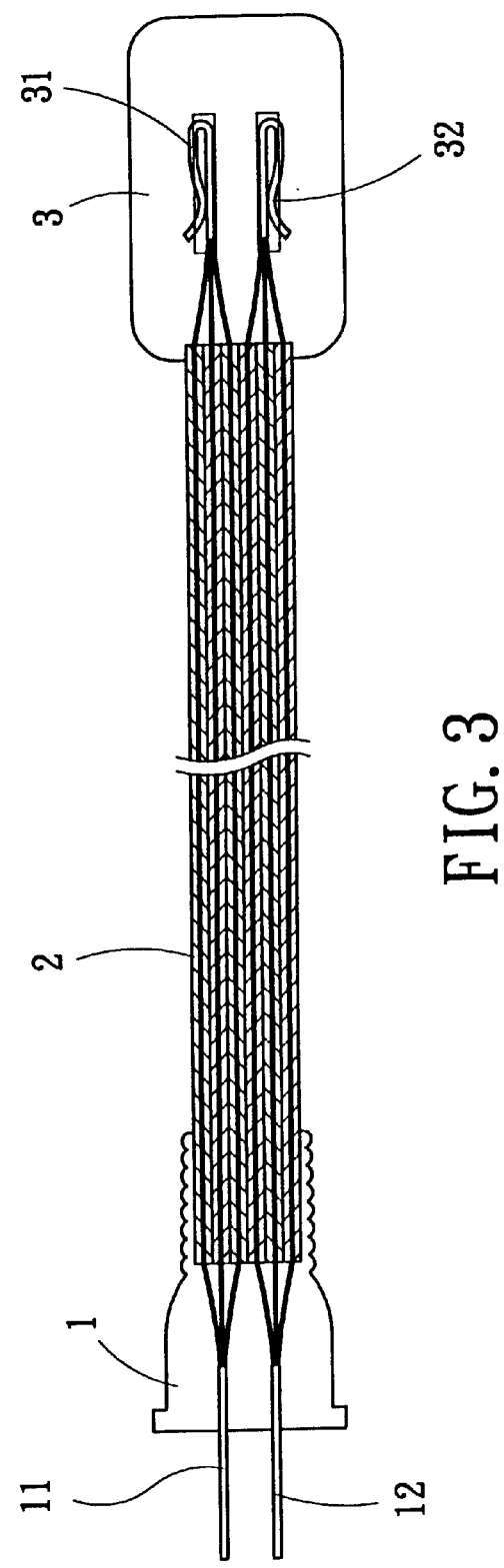
FIG. 3 shows the electrical connection of the internal conductive wires of the first embodiment of the present invention.

The flat cable type extension wire of the present invention has a flat bus-line structure including a first wire group 21 and a second wire group 22, as shown in FIGS. 2 and 3. The first wire group 21 and the second wire group 22 of the extension wire respectively include a plurality of parallelly arranged conductive wires 20. The conductive wires 20 are coated with an insulative material. With respect to the electric connection, one end of each conductive wire of the first wire group 21 is connected with a first plug terminal 11 of the plug 1, while the other end of the conductive wire is connected to a first conductive contact 31 of the socket 3. Similarly, one end of each conductive wire of the second wire group 22 is connected with second plug terminal 12 of the plug 1, while the other end of the conductive wire is connected to a second conductive contact 32 of the socket 3.

According to a preferred embodiment of the present invention, the first wire group 21 and the second wire group 22 are isolated from each other by an insulative section 23 with a certain width so as to achieve a better insulation effect between the two groups of conductive wires. In addition, in an extended state of the extension wire of the present invention, a simple wire-securing member (such as a nail or a thumb tack) can be thrust through the insulative section 23 to temporarily locate the extension wire without using the conventional wire clip, etc.

In use of the extension wire of the present invention, the plug 1 is plugged into a wall socket and the socket 3 is pulled to a desired position for supplying electric power for an electric appliance.

Figure 4:
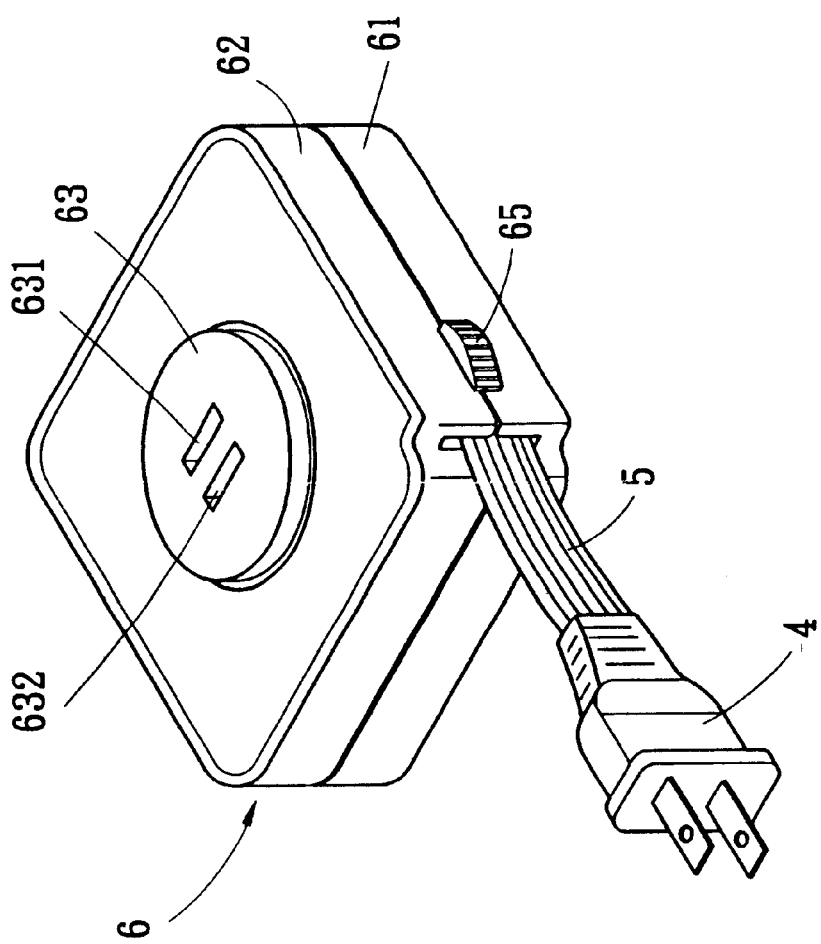
FIG. 4 is a perspective view of a second embodiment of the flat cable type extension wire of the present invention.
Figure 5:
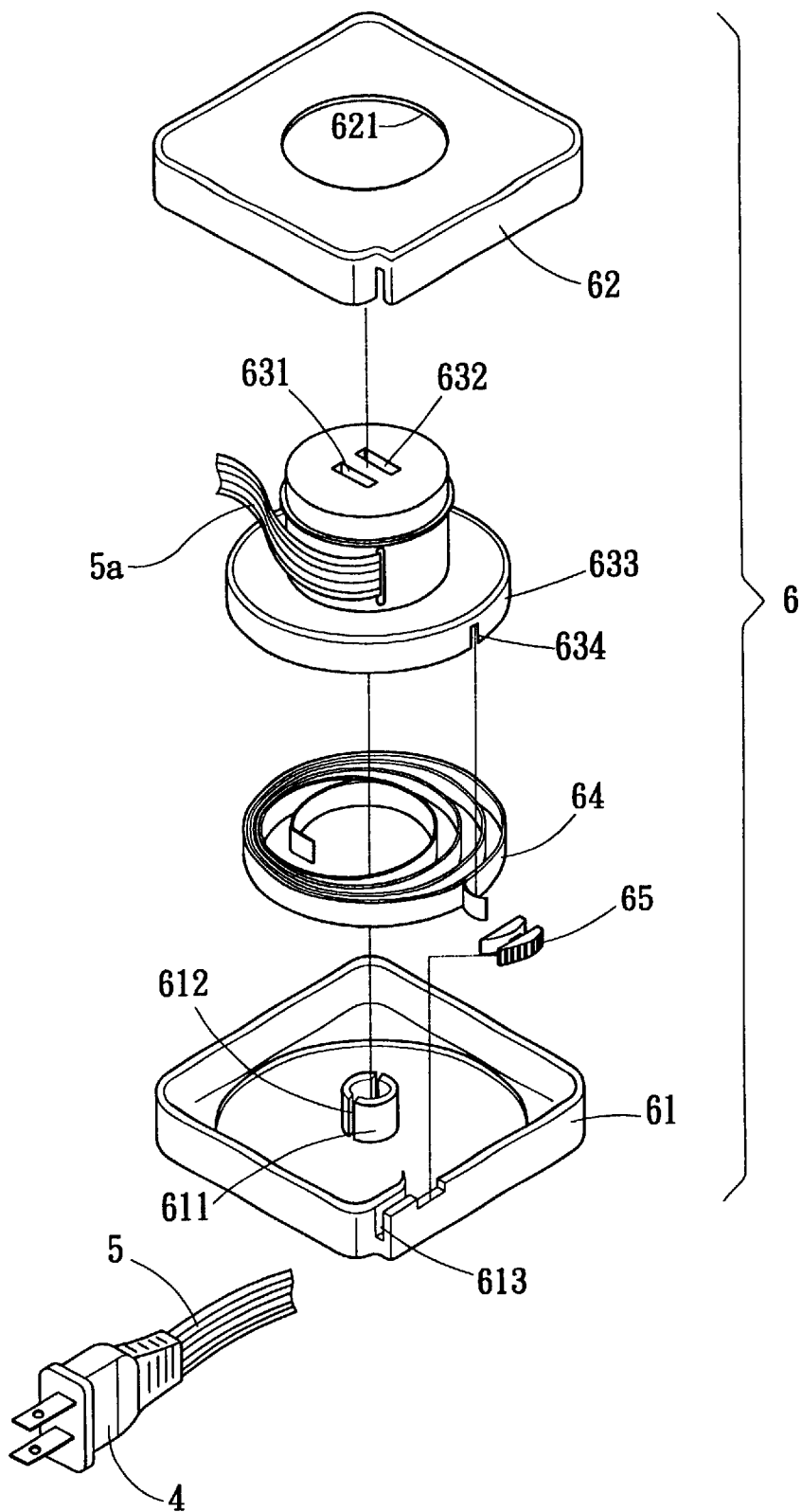
FIG. 5 is an exploded view of the second embodiment of the flat cable type extension wire of the present invention.

FIGS. 4 and 5 show a second embodiment of the present invention, in which the flat cable type extension wire is further connected with a winding mechanism. One end of the windable flat cable 5 is connected with a plug 4, while the other end thereof is wound in a winding mechanism 6. The winding mechanism 6 includes a lower casing 61, an upper casing 62, a winding reel 63 and a winding spring 64.

The winding reel 63 is a hollow cylinder around which the flat cable 5 is wound. A top of the winding reel 63 can be flush with or protrude beyond a central opening 621 of the upper casing 62. The top of the winding reel 63 is formed with two insertion holes 631, 632 in which two metal plates are inserted to serve as an electric socket.

The bottom of the winding reel 63 is formed with a tray body 633. The lateral wall of the tray body 633 is formed with a longitudinal engaging notch 634. An inner end 5a of the two wire groups of conductive wires of the flat cable 5 extends into the winding reel 63 to be soldered with the metal plates in the insertion holes 631, 632.

The winding reel 63 via the winding spring 64 is located on the lower casing 61. An inner end of the winding spring 64 is engaged in an engaging slit 612 of a central post 611 of the lower casing 61. An outer end of the winding spring 64 is engaged in the engaging notch 634 of the tray body 633 of the winding reel 63.

Figure 6:
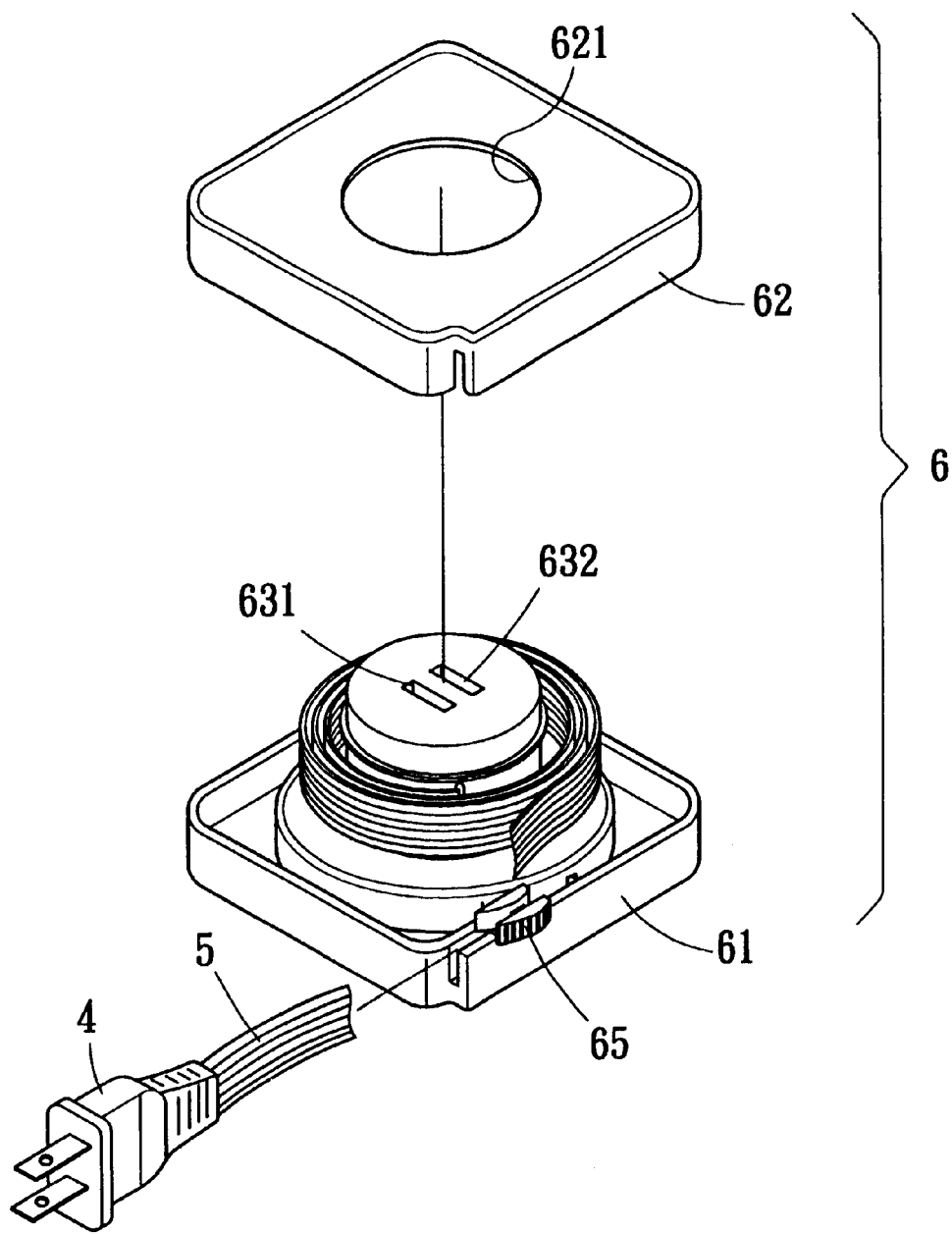
FIG. 6 is a perspective view according to FIG. 4, showing that the upper casing is separated from the lower casing.

When the flat cable 5 of the windable extension wire of the second embodiment of the present invention is not outwardly pulled, by means of the winding force of the winding spring 64, the flat cable 5 is collectively wound on the winding reel 63 (referring to FIG. 6). When the flat cable 5 is subject to an outward pulling force, the winding reel 63 is rotated, whereby the flat cable 5 is unwound and pulled out from a release slot 613. In addition, the lower casing 61 can further include an engaging member 65 disposed at the release slot 613 of the lower casing 61. When the flat cable 5 is pulled outward, the engaging member 65 can be easily outward pushed to resist against the resilient winding force of the winding spring 64. Accordingly, the flat cable 5 can be located by a fixed pulling length.

In this embodiment, the winding spring is a coil spring. However, other equivalent resilient member with the winding force can be alternatively used as the winding spring. In use of the winding type extension wire of the present invention, the plug 4 is pulled to unwind the flat cable 5 out of the housing. Then the plug 4 is plugged into a domestic socket for supplying power for a distal electric appliance. The flat cable can be temporarily fixed by a nail or a thumb tack to be attached to a ground or a wall corner. When it is desired to wind up the flat cable, the flat cable is released from the engaging force of the engaging member 65, whereby the winding spring can wind and collect the extension wire into the housing.

It is to be understood that the above description and drawings are only used for illustrating some embodiments of the present invention, not intended to limit the scope thereof. Any variation and derivation from the above description and drawings should be included in the scope of the present invention.

What is claimed is:

1. A flat cable type extension wire comprising:

a plug having a first plug terminal and a second plug terminal insulated from each other;

a socket having a first conductive contact and a second conductive contact insulated from each other;

a flat cable comprising a first wire group and a second wire group, each wire group comprising a plurality of parallelly arranged conductive wires, a first end of each of the plurality of conductive wires of the first wire group connected with the first plug terminal of the plug, a second end of each of the plurality of conductive wires of the first wire group connected to the first conductive contact of the socket, a first end of each of the plurality of conductive wires of the second wire group connected with the second plug terminal of the plug, a second end of each of the plurality of conductive wires of the second wire group connected to the second conductive contact of the socket; and a winding mechanism for winding the flat cable thereon, the winding mechanism comprising:

an upper casing;

a lower casing mated with the upper casing to define an internal space with a release slot; and a winding reel disposed in the internal space and comprising a hollow cylinder around which the flat cable is wound, a top of the winding reel having two insertion holes, a bottom of the winding reel being formed with a tray body, a lateral wall of the tray body having a longitudinal engaging notch, a first end of the flat cable extending through the engaging notch into the winding reel to electrically connect with the insertion holes, a second end of the flat cable extending out of the release slot and having a plug thereon; and a winding spring connected between the winding reel and the lower casing for providing a winding force for the winding reel so as to wind the flat cable on the winding reel.

2. The flat cable type extension wire as claimed in claim 1, further comprising an engaging member disposed at the release slot of the lower casing, whereby when the flat cable is pulled outward, the engaging member engages the flat cable so as to resist against the winding force of the winding spring, thereby preventing the flat cable from being wound back onto the winding reel by the winding spring.

* * * * *